United States Patent [19]

Rugab et al.

[11] Patent Number: 4,832,181

[45] Date of Patent: May 23, 1989

[54] TRACKING SYSTEM

[75] Inventors: David A. Rugab, Butler; Michael E. Ortmann, Kittanning, both of Pa.; Alan E. Thomas, Millville, N.J.

[73] Assignee: American Glass Research, Inc., Butler, Pa.

[21] Appl. No.: 33,057

[22] Filed: Apr. 1, 1987

Related U.S. Application Data

[63] Continuation of Ser. No. 762,959, Aug. 6, 1985, abandoned.

[51] Int. Cl.⁴ .......... B65G 43/00

[52] U.S. Cl. .......... 198/502.3; 198/503

[58] Field of Search .......... 198/502.3, 502.4, 340, 198/356, 460, 502.4, 571, 577, 855, 856; 209/564, 565, 566; 250/223 R

[56] References Cited

U.S. PATENT DOCUMENTS

| | | | |
|---|---|---|---|
| 2,966,253 | 12/1960 | Gerrans | 198/460 X |
| 3,436,540 | 4/1969 | Lamorlette | 250/223 R X |
| 3,446,978 | 5/1969 | Leavens, Jr. | 250/223 R X |
| 3,565,248 | 2/1971 | Messerschmidt | 250/223 R X |
| 3,743,090 | 7/1973 | Brown et al. | 198/356 X |
| 3,743,913 | 7/1973 | Rebucci | 198/502.4 X |
| 3,944,049 | 3/1976 | Graybill | 198/460 |
| 3,952,856 | 4/1976 | Kurzweil et al. | 198/460 |
| 3,960,640 | 6/1976 | Mort, Jr. et al. | 198/356 X |
| 4,105,925 | 8/1978 | Rossol et al. | 901/47 X |
| 4,119,055 | 10/1978 | Ward et al. | 198/502.4 X |
| 4,258,840 | 3/1981 | Conkle | 198/855 X |
| 4,265,357 | 5/1981 | Amberg et al. | 198/460 |
| 4,276,983 | 7/1981 | Witmer | 250/223 R X |
| 4,281,243 | 7/1981 | Hudler | 250/223 R |
| 4,432,458 | 2/1984 | Daboub | 209/564 |
| 4,503,976 | 3/1985 | Cloud et al. | 209/564 X |

FOREIGN PATENT DOCUMENTS

| | | | |
|---|---|---|---|
| 58-157634 | 9/1983 | Japan | 198/340 |

*Primary Examiner*—Robert J. Spar
*Assistant Examiner*—James R. Bidwell
*Attorney, Agent, or Firm*—Kenyon & Kenyon

[57] ABSTRACT

The cavity tracking system employs a tracking station adjacent a screw feed with closely spaced sensors which operate on a first-in first-out memory manner. When a container passes the first sensor the actual encoder "count" obtained at that time is compared with the list of cavity numbers and associated calculated "counts" in the store and the cavity number associated with the actual count is fed to the first memory zone. When the container passes the second sensor, the cavity number is erased from the first zone and passed on to the next zone and so on. Upon passing the last sensor, the cavity number is fed to the read-out and/or further processed.

13 Claims, 2 Drawing Sheets

WHEN PDn IS PASSED:

TEST DATA FLAG n

IF FLAG CLEAR

RETURN

ELSE

GET CAVITY NUMBER FROM ZONE n

CLEAR DATA FLAG n

WRITE CAVITY NUMBER IN ZONE n-1

SET DATA FLAG n-1

RETURN

TRACKING SYSTEM

This a continuation of application Ser. No. 762,959 filed Aug. 6, 1985, now abandoned.

This invention relates to a tracking system. More particularly, this invention relates to a tracking system which can be used in the manufacture of containers, such as glass bottles.

As is known, when manufacturing containers, for example made of glass, molds are frequently provided in groups at a hot station to form the containers and various types of conveyors are employed to move the containers to a cooling station for cooling purposes and for shipment to an end user. It has also been known that various types of inspection stations can be provided between the hot station and the cold station in order to inspect each container for defects.

In some cases, each inspection station has been provided with a reject mechanism which can be activated by a suitable defect sensor so as to remove a defective container once detected. However, should a defect be caused by one particular mold in a mold group, several defective containers can be made before a determination is made that there is a defective mold.

It has also been commonplace in the construction of multi-station inspection machines to inspect for many defects and to save all rejects until the containers have passed through all the stations. It has also been known to correlate certain information regarding the mold in which a container was made, i.e. the "cavity number" with the reject information. To this end, use has been made of cavity tracking methods wherein a cavity number can be electronically assigned to a given container and tracked with the container through the various inspection stations. In such cases, after the containers have passed through all the inspection stations, the rejects can be eliminated and the corresponding cavity numbers can be investigated to determine if, for example, certain mold cavities are producing certain defects so as to permit repair or replacement of such mold cavities.

For example, it has been known to use a so-called open conveyor tracking technique wherein an encoder is used to gauge the travel of a conveyor while one proximity detector is placed at the beginning of an area through which containers are to be tracked and a second proximity detector is placed at the end of the tracking area. As a container passes the first detector, a cavity number is received from an upstream cavity indentification system or tacking device. Simultaneously, a count value from the encoder is recorded. Thereafter, when the container passes the second proximity detector second count value is recorded from the encoder and compared against a range of counts which correspond to the distance travelled by the conveyor between the two proximity detectors. Presuming the container has not moved relative to the conveyor the cavity number of the container is then passed to a downstream tracking device or other downstream system.

However, it has been found that if the sequence of containers passing through the inspection stations changes or if the spacing between the containers changes accidentally or otherwise, the final results of the cavity tracking system may be in error.

Further, inspection machines are frequently provided with inlet stations, for example, employing a rotatable screw, for the individual inlet of a container. In such cases, a series of containers may stack up behind the screw such that the conveyor moves relative to the containers. In such cases, open conveyor tracking will not give efficient results.

Accordingly, it is an object of the invention to provide a reliable tracking system for containers which tend to stack up on a conveyor belt.

It is another object of the invention to maintain a one-to-one correspondence between a container and its electronic label as the container passes through an area where containers stack up or change speed and undergo relative motion.

It is another object of the invention to provide a relatively simple system for tracking containers moving through a stacked region of a conveyor.

Briefly, the invention provides a tracking system which is comprised of a conveyor belt for conveying a series of containers, such as glass bottles, through a series of inspection stations, an identification station disposed along the conveyor belt and having means for generating an identification signal in the form of a "cavity number" corresponding to a container passing thereby, an encoder for generating a "count" pulses corresponding to the travel of the conveyor belt, a tracking station disposed along the conveyor belt adjacent an area where containers stack up or change speed and undergo relative motion, a screw infeed being an example, with the tracking station including a plurality of closely spaced sensors each of which is disposed to generate a "present" signal in response to a container passing thereby and a programmer means connected to the identification station, encoder and tracking station.

The programmer means is provided with a store or memory to sequentially receive and store each "cavity number" generated at the identification station as well as a plurality of zones for sequentially receiving each cavity number from the store. In addition, means are provided which are responsive to a "present" signal from a first of the sensors and a corresponding "count" signal from the encoder in order to pass a first of the "cavity numbers" in the store (memory) to a first of these zones. Means are also provided which are responsive to a "present" signal from a second sensor to pass the "cavity number" in the first zone to a second zone.

In other words, as a bottle passes the first sensor, the cavity number associated with the container is placed in the store of the programmer means. When the container passes the second sensor, the cavity number is destructively read from the store and passed into a memory in the first zone. Since there are no time constraints on when the bottle must pass the second sensor, the bottle may slide or hesitate on the conveyor belt. Further, if the container is removed from the area between the sensors, the bottle does not pass the second sensor. Hence, its cavity number is not passed down the line. Furthermore, the next bottle which does pass the second sensor will overwrite the memory with its own cavity number and that correct number will be passed down the line when this bottle passes the next sensor.

As long as a bottle is moving smoothly through the array of sensors its associated cavity number will be shifted from one zone to the next in proper sequence. When a cavity number is passed from one zone to the next, a message can be left behind indicating "empty". This "empty" message can then be used to instruct the programmer means not to pass a cavity number into the next zone in response to a "present" signal from the sensor array. Hence, if a bottle is placed between two others in the stream, the next sensor it passes sends the "empty" message ahead. Thus, the system recognizes that this container was inserted and applies "unknown cavity number" to this bottle.

The tracking system may also employ a read-out means which is connected to the programmer means in order to receive and read-out the "cavity number" from a last of the zones associated with the sensor array in response to a "present" signal from a last of the sensors in the array.

The above tracking technique may employ a single-element first in-first out memory in the form of a set of flip-flop switches in each zone to accomplish the array tracking task. For example, in response to a bottle passing the first sensor, the cavity number is deliveres from the store and shifted into the set of flip-flop switched in the first zone. When the bottle passes the second sensor, the cavity number is destructively read from the first zone, i.e., by being erased from the switches and passed to the set of flip-flop switches in the next zone.

In the case of glass bottles of cylindrical cross section, the sensors of the sensor array are placed less than one bottle diameter apart along the length of the conveyor belt. In this case, each sensor may be an optical proximity detector comprised of a high intensity infrared-emitting diode and a photosensor. In addition, the diode is positioned to emit light at a first angle onto a surface of a glass bottle passing thereby while the photosensor is positioned to receive light reflected from the bottle surface at a second angle. By placing the diode and photosensor at a slight angle to the horizontal, spurious reflections from other nearby objects can be eliminated. In addition, a short focal length lens can be positioned in front of each diode and each photosensor in order to sharply limit the field of view of each.

The encoder for generating a signal representative of the travel of the conveyor belt can be coupled to the conveyor belt by a rubber tired wheel which is mounted on a shaft of the encoder to be driven by frictional engagement with the conveyor belt.

The tracking system may be employed wherever a series of containers, such as glass bottles, are conveyed past various inspection stations and wherein a stacking-up of the containers may occur, for example at a feed screw. In this respect, the tracking system would be connected between tracking devices in order to receive and convey a "cavity number" signal associated with a conveyed container. To this end, the upstream tracking device would be connected to the store of the programmer means in order to deliver the "cavity number" signal when the associated container has entered the tracking system. As the container thereafter moves along the conveyor, the "cavity number" signal can be relayed from switch to switch, i.e., zone to zone in the programmer means until the container leaves the tracking system. At this time, the "cavity number" signal would be passed from the last flip-flop switch to the downstream tracking device or to the read-out means for subsequent processing.

These and other objects and advantages of the invention will become more apparent from the following description taken in conjunction with the accompanying drawings wherein.

Figure 1:
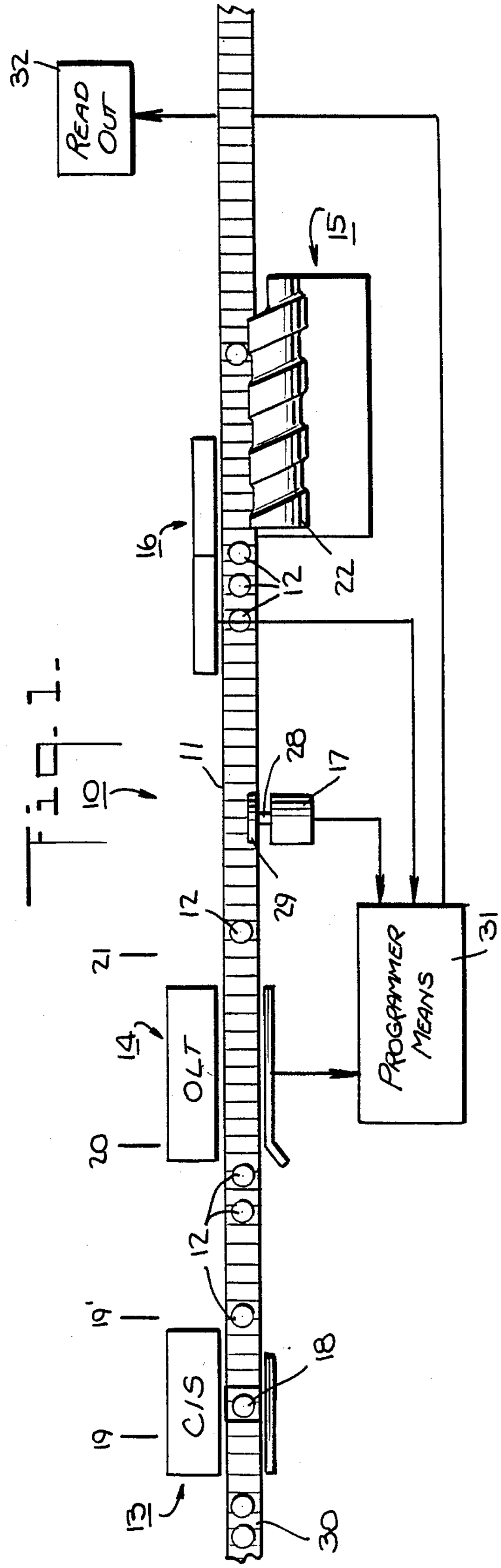
FIG. 1 illustrates a diagrammatic view of a tracking system constructed in accordance with the invention.

Referring to FIG. 1, the tracking system 10 includes a single line conveyor 11, such as a conveyor belt, for conveying a series of containers, such as glass bottles 12 through a cavity identification system 13, an on-line thickness selector 14, a screw feed 15 of an inspection apparatus and a tracking station 16 adjacent the screw feed 15. In addition, an encoder 17 is positioned between the on-line thickness selector 14 and the tracking station 16.

The conveyor belt is of any suitable construction, for example, the belt may be made up of a plurality of interconnected links which provide a continuous flat surface on which the bottles 12 may stand and be conveyed.

The cavity identification system 13 is of known construction and is available from American Glass Research of Butler, Pa. In this regard, the cavity identification system may be constructed with a read module which is attached to the conveyor and provides the handling necessary to bring the bottles 12 off-line over a camera 18 while returning the bottles 12 to the original conveyor. With each bottle provided with a single ring binary code molded into the bottom, each bottle is passed through the read module and a strobe transmits light through the bottle. The camera 18 images the code so that the read module transmits the image to a decode module which processes the data so as to produce a cavity number for each bottle which passes through.

The cavity identifications system 13 is provided with suitable sensors 19, 19' for tracking of a bottle through the system 13; the upstream sensor 19 determining the presence of a bottle entering the identification system and the downstream sensor 19' determining the presence of the bottle at the outlet of the identification system.

The on-line thickness selector 14 is an inspection device of conventional structure and is available from American Glass Research, Inc., of Butler, Pa. This selector 14 operates so as to measure the thickness of a single bottle 12 passing therethrough. In this respect, the on-line thickness selector 14 operates on only a single bottle at a time. Thus, the individual bottles are accelerated upon entering the selector 14 so as to provide individual attention. During this time, the individual bottle are lifted from the conveyor belt 11.

The thickness selector 14 is also provided with a pair of sensors 20, 21 for tracking of a bottle therethrough, the upstream sensor 20 determining the presence of a bottle at the entry to the thickness sensor (not shown) within the selector 14 and a downstream sensor 21 which determines the presence of a bottle at the output of the selector 14.

In addition, the thickness selector 14 includes a microprocessor (not shown) in an information interface cabinet (not shown) which accepts cavity numbers, encoder counts and inputs from the sensors 19', 20, 21 and "tracks" the cavity number through the thickness selector 14. Then, that microprocessor passes the cavity number, etc. to another microprocessor 31 in an information interface cabinet (not shown) associated with the inspection apparatus having the screw feed 15.

The screw feed 15 is also of conventional structure. To this end, the screw feed includes a screw 22 which receives and spaces individual bottles for input to other systems or devices.

Figure 3:
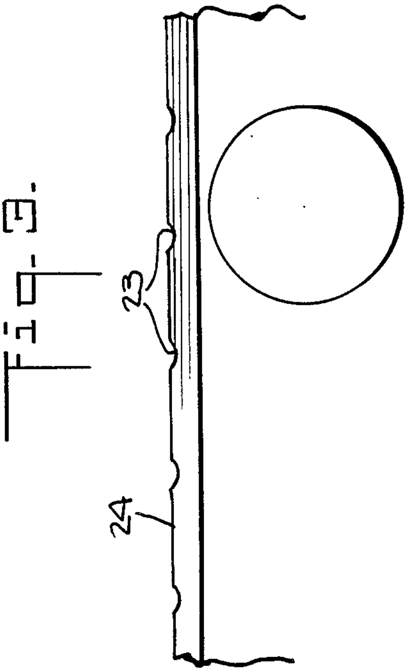
FIG. 3 illustrates a plan view of the tracking sensor array in FIG. 2.
Figure 2:
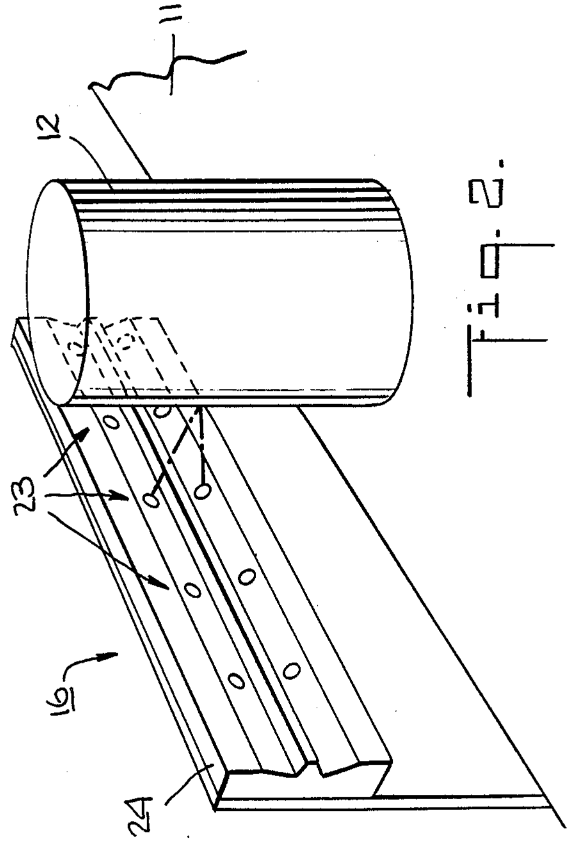
FIG. 2 illustrates a tracking sensor array used in the system of FIG. 1 in accordance with the invention.

The tracking station 16 includes a plurality of closely spaced sensors 23 each of which is disposed to generate a "present" signal in response to a bottle 12 passing thereby. Referring to FIGS. 2 and 3, the sensors 23 are spaced apart a distance less than the diameter of a bottle 12 for reasons as explained below. In addition, the sensors 23 are disposed in a housing module 24 of elongated shape.

Figure 4:
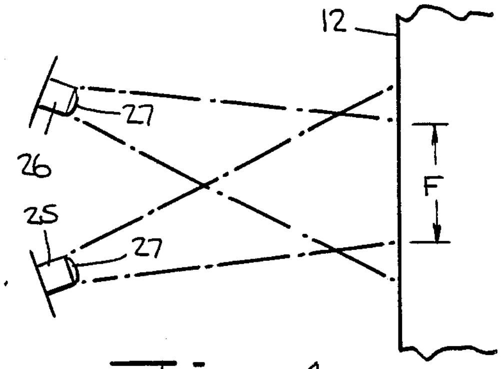
FIG. 4 illustrates the angular position of the elements of an optical proximity detector disposed in accordance with the invention.

As indicated in FIG. 4, each sensor 23 includes a pair of electro-optical devices, one of which is a high intensity infrared-emitting diode 25 for emitting a light across the conveyor belt 11, and the other of which is a photosensor 26 for receiving light reflected from a container 12 on the conveyor belt 11. As indicated, the light emitting diode 25 and the photosensor 26 of each sensor are disposed on opposite sides of a common horizontal plane. The diode 25 is positioned below the horizontal plane to direct light at an upwardly directed angle onto the surface of a passing bottle 12 while the photosensor 26 is positioned above the horizontal plane to receive reflected light at an angle from the surface of the bottle 12. In addition, a short focal length lens 27 is disposed in front of each of the diode 25 and the photosensor 26 in order to sharply limit the field of view of each. As indicated in FIG. 4, the field of view of the diode 25 and the photosensor 26 overlap each other within a common area F. Thus, the illuminated area and the field of view may overlap significantly for a relatively large range of reflecting surface positions. The use of the angular arrangement of the diode 25 and the photosensor 26 and the lenses provide a good signal-to-noise ratio which can be attained over a range of one-half inch to one inch distances between the detectors 22 and the reflecting surface of a bottle 12.

The encoder 17 is associated with the conveyor belt 11 in order to generate a signal formed of a sequence of pulses corresponding to the travel of the conveyor belt 11. As indicated, the encoder 17 includes a shaft 28 and a rubber-tired wheel 29 which is mounted on the shaft and which is in frictional engagement with the conveyor belt so as to be driven thereby under frictional contact. Upon rotation of the wheel 29 and the shaft 28, the encoder 17 generates a sequence of pulses. The operation of the encoder 17 is otherwise of conventional structure.

During normal operation of the system 10, a series of bottles 12 are passed through the cavity identification system 13 and the camera 18 forms an image of the code on the bottom of the bottle as each bottle passes over the camera which is located between the conveyor belt 11 and a delivery conveyor belt 30 to the identification system 13. Upon passing out of the identification system onto the conveyor belt 11, each bottle passes the sensor 19' so that a "present" signal is generated in association with the cavity number signal generated by the identification system. Subsequently, the series of bottles are individually passed through the selector 14 in known manner. During this time, each bottle is tracked between the sensors 20, 21 in known manner. Thereafter, the bottles are conveyed past the tracking station 16 and fed into the screw feed 15. Should the speed of the screw feed 15 be less than the speed of the conveyor belt 11, the bottles being to stack-up at the screw feed 15 while sliding relative to the conveyor belt 11.

The tracking system also includes the microprocessor 31 which is in the form of a programmer means and is connected to the on-line thickness selector 14, the downstream sensor 21, the encoder 17 and the tracking station 16. In addition, a read-out means 32 is connected to the programmer means 31 and is located, for example adjacent to the screw feed 15 for ease of viewing.

Figure 5:
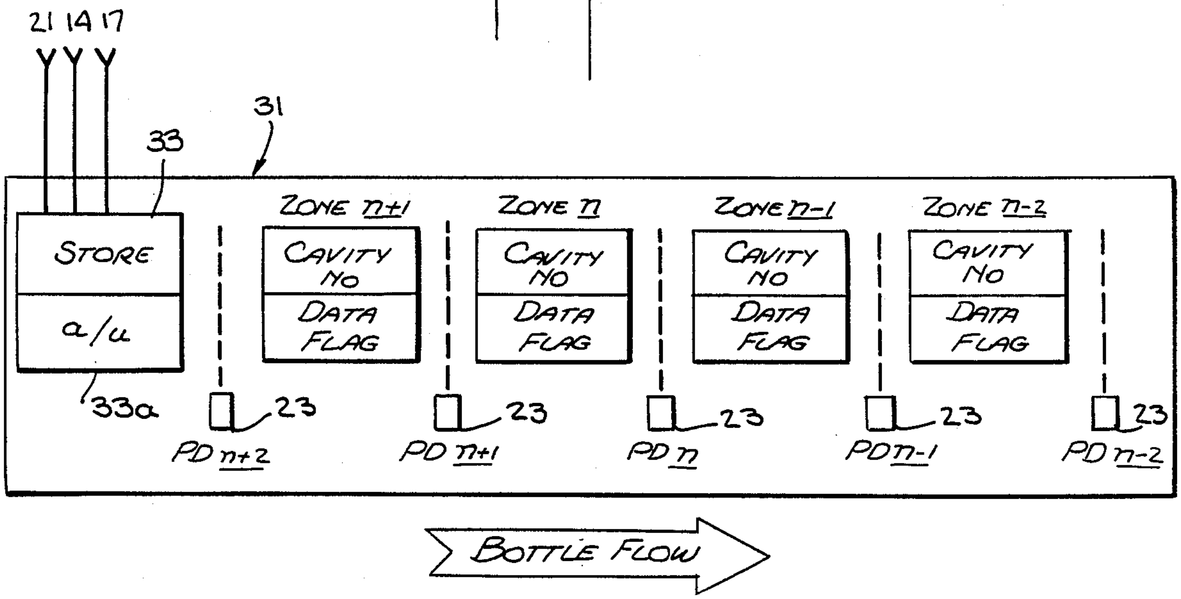
FIG. 5 graphically illustrates an algorithm for an array tracking method in accordance with the invention.

Referring to FIG. 5, the programmer means 31 includes a store 33 to sequentially receive and store each "cavity number" from the means in the immediately upstream inspection device 14 and a corresponding "present" signal from the downstream sensor 21 for each bottle 12. Also, input to the programmer means 31 is a series of "count" signals from the encoder 17, each signal corresponding to a known amount of distance of conveyor belt 11 travel. The programmer means 31 also includes an arithmetic and logic unit 33A. The programmer means 31 further includes a plurality of zones for sequentially receiving each"cavity number" from the store 33. Still further, means is provided in the arithmetic and logic unit 33A to perform the algorithm:

```
When sensor n is passed:
TEST DATA FLAG n
IF FLAG IS CLEAR
  RETURN
ELSE
GET CAVITY NUMBER FROM ZONE n
CLEAR DATA FLAG n
WRITE CAVITY NUMBER IN ZONE n-1
SET DATA FLAG n-1
  RETURN"
```

The read-out means 32 may be connected to the programmer means 31 in order to receive the cavity number from a last of the zones in response to a "present" signal from a last of sensors 23 of the tracking station 16.

The read-out means 32 may be in the form of a data collection means such as a computer which correlates the cavity number with reject data and presents the data in tabular form such as:

First Shift—July 19, 1985

| Cavity No. | Defect | No. Bottles Rejected |
|---|---|---|
| 5 | finish split | 24 |
| 8 | thin spot | 417 |
| 62 | stones - etc.- | 1822 |

Basically, the tracking station 16 is connected with the programming means 31 so as to effect an "array tracking". This technique relies on the assumption that two bottles cannot occupy the same physical space. Thus, the spacing between the sensors 23 is dependent upon the diameter of the conveyed bottles 12. That is, the sensors 23 are placed at a spacing which is less than the diameter of the bottle 12. With the sensors 23 placed as specified, there can be no confusion as to which cavity number is attached to which bottle 12. This is true as long as the bottles 12 move forward at any rate or even stop. This style of tracking also allows bottles to stop, start and bounce back while still identifying each bottle. If bottles are added or removed in the bottle progression, the identification of known bottles is unefected and the added bottles are known to be unidentified.

Referring to FIG. 5, after the first bottle passes the first sensor (PD n+2) of the tracking station 16, the cavity number of the bottle is entered into the first zone (n+1) while a data flag is set. This assumes that the correct bottle has been received in the tracking station 16.

Next, when the bottle passes the second sensor (PD n+1), a "present" signal is sent to the programmer means 31. In response, the cavity number from the first zone (n+1) is sent into the next zone (n) while the data flag in the first zone (n+1) is cleared and the data flag in the second zone (n) is set.

Next, as the bottle passes the third sensor (PD n), the same sequence is carried out. When the bottle passes the last sensor (PDn−2) of the tracking station 16, the "present" signal causes the programmer means 31 to deliver the cavity number to the read-out means 32. At this point, the cavity number can be visually displayed as the bottle passes through the screw feed 15 and/or otherwise utilized by a data collection means.

If the data flag in a zone is clear when tested in response to the transmit of a bottle past a sensor 23, no cavity number is passed from that zone to the next zone. This occurs, for example if a bottle has been inserted in the series. For example, once a bottle has been tracked properly, the cavity number is erased from one zone while being entered into the next zone. Thus, when an inserted bottle passes by the associated sensor, there is no cavity number in the upstream zone. Thus, there is no cavity number to be passed on. Instead, a message saying "empty" may be emitted via the programmer means to the read-out means 32 when this spurious bottle passes into the feed screw 15. Alternatively, a designation that the cavity number is unknown may also be used.

Basically, the array tracking operates on the principle that a bottle must arrive at the first sensor before arriving at the next sensor and that the first bottle must arrive at the second sensor before the next bottle (in the progression) arrives at the first sensor. The advantages of the array tracking techniques are that it can deal with starts, stops, slips, and limited bounce-back.

With respect to the bounce-back, the following example is given:

If a bottle is moving smoothly through an array of sensors 23 the bottle passes one sensor PD2 and its cavity number is shifted into the zone (n). After passing the next sensor (PDn) the cavity number is shifted into the next zone (n−1). If the bottle slows down or stops but eventually passes the next sensor (PDn−1) the cavity number is shifted into the zone (n−2) However, if the bottle hits another bottle and bounces back past sensor (PDn−1) so long as the following bottle has not passed sensor (PDn) no harm is done. That is, there is no cavity number in the zone (PDn) but the correct cavity number appears in zone (n−2). Thus, when the bottle passes the sensor (PDn−1) for the third time, there is no cavity number to be passed from zone (PDn) so that the cavity number of the bottle remains in zone (n−2).

Of note, tracking can be carried out in the screw feed 15 in a known manner.

The invention thus provides a relatively simple technique for tracking containers in an area which is prone to stacking up of the containers, for example at a screw feed. Thus, should a stacking up or jam occur, the tracking system is self-starting. That is, as soon as the jam clears to a point where the containers are able to move freely on the conveyor belt 11, tracking begins anew.

The programming means 31 and read-out means 32 can be constructed so as to provide useful information concerning glass container defects. Specifically, since many glass bottle defects are correlated with the cavity in which they are blown, it is helpful to know which cavities are producing defects. It is also useful to know what the defect is that is being found in bottles from a given cavity. Thus, a suitable print-out means can be provided in the tracking system to give a read-out of defects and cavity numbers of bottles which have been inspected.

Further, the tracking system is able to perform reliably even if the bottles have been removed during conveyance or bottles inserted on the conveyor belt.

What is claimed is:

1. A tracking system comprising a conveyor belt for conveying a series of bottles;

an identification system disposed at a predetermined point along said conveyor belt and having first means for generating a "cavity number" corresponding to each bottle passing thereby;

an encoder for generating a "count" signal corresponding to the travel of said conveyor belt;

a tracking station disposed along said conveyor belt downstream of said identification station, said tracking station including a plurality of closely spaced sensors, each said sensor being disposed to generate a "present" signal in response to a bottle passing thereby;

programmer means connected to said identification station, said encoder and said tracking station, said programmer means including a store to sequentially receive and store each "cavity number" from said first means and a corresponding "count" signal from said encoder to identify each bottle, a plurality of zones for sequentially receiving each said "cavity number" from said store, a plurality of data flags, each said data flag being disposed in a respective zone to indicate one of a "set" condition with a "cavity number" in said respective zone and a "clear" condition in the absence of a "cavity number" in said respective zone, said store being responsive to a "present" signal from a first of said sensors and a corresponding "count" signal from said encoder to pass a first of said "cavity numbers" in said store to a first of said zones while setting said data flag in said first zone to said "set" condition, said programmer means being responsive to a "present" signal from a second of said sensors to pass the "cavity number" in said first zone to a second of said zones while setting said data flag in said first zone to said "clear" condition and setting said data flag in said second zone to said "set" condition thereof prior to said first sensor generating a "present" signal in response to a second bottle passing thereby, wherein the "cavity number" in said second zone or in any succeeding zone remains unchanged if the data flag in the zone preceding said second or succeeding zone is in the "clear" condition; and read-out means connected to said programmer means to receive and read-out the "cavity number" from a last of said zones while setting said data flag in said last zone to said "clear" condition thereof in response to a "present" signal from a last of said sensors.

2. A tracking system as set forth in claim 1 wherein said encoder includes a rotatable shaft for generating said sequence of counts and a rubber-tired wheel mounted on said shaft and engaging said belt for rotating said shaft in response to movement of said belt.

3. A tracking system as set forth in claim 1 wherein said sensors are spaced apart a distance less than a diameter of a bottle.

4. A tracking system comprising a conveyor belt for conveying a series of containers;

first means disposed at a predetermined point along said conveyor belt for generating an "identification signal" corresponding to each container passing thereby;

an encoder for generating a "count" signal corresponding to the total travel of said conveyor belt;

a screw feed disposed along said conveyor belt for individually inletting the containers to an inspection machine in equi-spaced relation;

a tracking station disposed along said conveyor belt adjacent said screw feed, said tracking system including a plurality of closely spaced sensors, each said sensor being disposed to generate a "present" signal in response to a container passing thereby;

programmer means connected to said first means, said encoder and said tracking system, said programmer means including a store to sequentially receive and store each "identifications signal" from said first means and corresponding "count" signal from said encoder to identify each container, a plurality of zones for sequentially receiving each said "identification signal" from said store, a plurality of data flags, each said data flag being disposed in a respective zone to indicate one of a "set" condition with a "identification signal" in said respective zone and a "clear" condition in the absence of a "identification signal" in aid respective zone, said store being responsive to a "present" signal from a first of said sensors and a corresponding "count" signal from said encoder to pass a first of said "identification signals" in said store to a first of said zones while setting said data flag in said first zone to said "set" condition, said programmer means being responsive to a "present" signal from a second of said sensors to pass an "identification signal" in said first zone to a second of said zones while setting said data flag in said first zone to said "clear" condition and setting said data flag in said second zone to said "set" condition thereof prior to said first sensor generating a "present" signal in response to a second container passing thereby, wherein the "identification signal" in said second zone or in any succeeding zone remains unchanged if the data flag in the zone preceding said second or succeeding zone is in the "clear" condition; and read-out means connected to said programmer means to receive and read-out the "identification signals" from a last of said zones while setting said data flag in said last zone to said "clear" condition thereof in response to a "present" signal from a last of said sensors.

5. A tracking system comprising a conveyor belt for conveying a series of containers;

a first means disposed at a predetermined point along said conveyor belt for generating an "identification signal" corresponding to each container passing thereby;

an encoder for generating a "count" signal corresponding to the total travel of said conveyor belt;

a tracking station disposed along said conveyor downstream of said first means, said tracking system including a plurality of closely spaced sensors, each said sensor being disposed to generate a "present" signal in response to a container passing thereby;

programmer means connected to said first means, said encoder and said tracking system, said programmer means including a store to sequentially receive and store each "identification signal" from said first means and a corresponding "count" signal from said encoder to identify each container, a plurality of zones for sequentially receiving each said "identification signal" from said store, a plurality of data flags, each said data flag being disposed in a respective zone to indicate one of a "set" condition with an "identification signal" in said respective zone and a "clear" condition in the absence of an "identification signal" in said respective zone, a first switch responsive to a "present" signal from a first of said sensors and a corresponding "count" signal from said encoder to pass a first of said "identification signals" in said store to a first of said zones while setting said data flag in said first zone to said "set" condition, at least a second switch responsive to a "present" signal from a second of said sensors to pass an "identification signal" in an upstream zone to a downstream zone while setting said data flag in said upstream zone to said "clear" condition and setting said data flag in said downstream zone to said "set" condition thereof prior to an adjacent upstream sensor generating a "present" signal in response to another container passing thereby, wherein the "identification signal" in said second zone or in any succeeding zone remains unchanged if the data flag in the zone preceding said second or succeeding zone is in the "clear" condition; and means connected to said programmer means for receiving the "identification signal" from a last of said zones while setting said data flag in said last zone to said "clear" condition thereof in response to a "present" signal from a last of said sensors.

6. A tracking system as set forth in claim 5 wherein each said switch is a set of flip-flop switches.

7. A method of tracking comprising the steps of placing a series of containers on a conveyor surface moving along an elongated path;

emitting a first signal in response to movement of the conveyor surface and increasing the value of said signal in response to continued movement of the conveyor surface in said path;

thereafter detecting the passage of each container past a sensing means disposed along said path and storing the current value of said first signal in a store in response thereto;

receiving and storing an identification signal corresponding to each container in said store in response to said detection of each container;

detecting the passage of a first container past a first of an array of closely spaced sensors disposed along said path downstream of the sensing means;

passing the identification signal from said store to a first of a plurality of zones while setting a data flag in said first zone to a "set" condition in response to the detection of the first container at said first sensor;

sequentially transferring each stored identification signal to said first zone while setting the data flag therein to said "set" condition in response to the associated container passing said sensing means and said first sensor in sequence; and sequentially passing the identification signal in one of said zones to a downstream zone while setting said data flag in said one zone to a "clear" condition and setting a data flag in said downstream zone to a "set" condition thereof in response to passage of an associated container past a second of said sensors and prior to a sensor upstream of said second sensor generating a present signal in response to a second container passing thereby, wherein the "identification signal" in said second zone or in any succeeding zone remains unchanged if the data flag in the zone preceding said second or succeeding zone is in the "clear" condition.

8. A method as set forth in claim 7 which further comprises the steps of placing a series of containers on the conveyor surface, storing an identification signal and a current value of said first signal for each container in said store, and sequentially transferring each stored "identification signal" to said first zone in response to the associated container passing said sensing means and said first sensor in sequence.

9. A method as set forth in claim 7 which further comprises the steps of obtaining a value of said first signal in response to the detection of the container at said first sensor, comparing the obtained signal value with a calculated value for the position of said first sensor and passing the identification signal from said store to said first zone in response to the detection of the container at said first sensor and matching of the obtained value of said first signal with the calculated value of said first signal.

10. A method as set forth in claim 7 which further comprises the steps of placing a series of containers on the conveyor surface;

sequentially storing an identification number and a current value of said signal for each container in said store;

increasing each current value by an amount corresponding to the distance between said sensing means and said first sensor to obtain a calculated value of said signal for each container;

obtaining a value of said first signal in response to the detection of a container at said first sensor;

comparing the obtained value with the calculated values in said store to obtain a match; and passing the identification signal in said store corresponding to the matched values from said store to said first zone.

11. A tracking sensor array for a conveyed series of objects comprising a plurality of electro-optical sensors disposed along an elongated path, each said sensor including a high intensity infrared-emitting diode for emitting a light at a first angle onto a surface of an object passing thereby, a short focal length lens in front of said diode, a photosensor for receiving light reflected from the surface of the object at a second angle and a short focal length lens in front of said photosensor, said sensors being spaced apart at a distance less than a longitudinal length of the object.

12. A tracking sensor array for a conveyed series of objects comprising a module; and a plurality of electro-optical sensors housed with a module along a longitudinal axis and along an elongated path, each said sensor including a high intensity infrared-emitting diode emitting a light at a first angle onto a surface of an object passing thereby and a photosensor for receiving light reflected from the surface at a second angle, said sensors being spaced apart at a distance less than a longitudinal length of the object.

13. A tracking sensor array for a conveyed series of objects comprising a plurality of electro-optical sensors disposed along an elongated path, each said sensor including a high intensity infrared-emitting diode for emitting a light at a first angle onto a surface of an object passing thereby and a photosensor for receiving light reflected from the surface at a second angle, said sensors being spaced apart at a distance of About $1\frac{1}{4}$ inches along said path.

* * * * *

UNITED STATES PATENT AND TRADEMARK OFFICE

CERTIFICATE OF CORRECTION

PATENT NO. : 4,832,181

DATED : May 23, 1989

INVENTOR(S) : David A. Rugaber

It is certified that error appears in the above-identified patent and that said Letters Patent is hereby corrected as shown below:

Front Page, Title [75] change "Rugab" to -Rugaber--

Column 1, line 51 "tacking" should be --tracking--

Column 1, line 54 "tor second deter" should be --tor a second--

Column 3, line 15 "deliveres" should be --delivered--

Column 3, line 16 "switched" should be --switches--

Column 4, line 36 "identifications" should be --identification--

Column 4, line 52 "bottle" should be --bottles--

Column 9, line 34 "aid" should be --said--

Column 12, line 24 "a" should be --said--

Signed and Sealed this

Tenth Day of April, 1990

*Attest:*

HARRY F. MANBECK, JR.

*Attesting Officer*

*Commissioner of Patents and Trademarks*